United States Patent [19]
Green

[11] Patent Number: 5,297,106
[45] Date of Patent: Mar. 22, 1994

[54] METHOD AND APPARATUS FOR CONTROLLING INTEGRATION TIME ON MULTIPLEXING STARING ARRAYS

[75] Inventor: Paul E. Green, La Mirada, Calif.

[73] Assignee: Rockwell International Corporation, Seal Beach, Calif.

[21] Appl. No.: 769,302

[22] Filed: Oct. 1, 1991

[51] Int. Cl.$^5$ ............................................. H04N 3/14
[52] U.S. Cl. .................... 365/233; 307/480; 340/825.1; 348/302
[58] Field of Search .................. 377/114, 75, 111; 307/480; 340/825.1; 365/233; 358/213.11

[56] References Cited
U.S. PATENT DOCUMENTS

| | | | |
|---|---|---|---|
| 3,264,567 | 8/1966 | Prieto | 377/111 |
| 4,027,175 | 5/1977 | Hurst | 377/114 |
| 4,284,953 | 8/1981 | Hepworth et al. | 377/75 |
| 4,553,100 | 11/1985 | Nishima | 377/114 |

Primary Examiner—William L. Sikes
Assistant Examiner—Shawn Riley
Attorney, Agent, or Firm—H. Fredrick Hamann; George A. Montanye; Philip K. Yu

[57] ABSTRACT

A METHOD AND APPARATUS FOR CONTROLLING INTEGRATION TIME ON MULTIPLEXING STARING ARRAYS for selecting all or any portion of each row integration scan for charging integration capacitors from a scanned staring array by providing a row ON selection clock signal, providing a signal corresponding to all or a portion of the time the row is to be connected to the capacitors, and nanding the row ON signal and the corresponding signal to select the time allotted for charging said capacitors.

7 Claims, 3 Drawing Sheets

"METHOD AND APPARATUS FOR CONTROLLING INTEGRATION TIME ON MULTIPLEXING STARING ARRAYS"

This invention was made with Government support under Contract No. DAAB07-89-C-F203 awarded by the Army. The Government has certain rights in this invention.

BACKGROUND OF THE INVENTION

1. Field of the Invention

The present invention is a method and apparatus for controlling the integration of staring arrays.

2. Prior Art

Conventional staring arrays adjust integration time by injecting a variable row pulse width at the start of the array scan. The pulse width must be a submultiple of the scan clock. The resulting integration time for a row scan is therefore fixed for the complete array. This limits the integration amount to a fixed amount across the complete array even though the system optics delivers a variable gain signal across the array. As a result of the fixed gain scan, the system processing electronics is required to correct each received signal.

SUMMARY OF THE INVENTION

The present invention modifies the scanning electronics to allow an adjustable integration time for each row. FIG. 1 shows a schematic of the logic for a fixed integration period scanning array.

FIG. 2 gives the logic embodiment of the invention. FIG. 3 shows a schematic of the logic modified to allow for variable adjustment of the integration time for each row. An external input sets the integration time that can be applied to each row. This adjustment of integration time allows for correction for the system optics without having to adjust the gain of each received signal in the system processing electronics.

DETAILED DESCRIPTION OF A PREFERRED EMBODIMENT OF THE INVENTION

Figure 1:
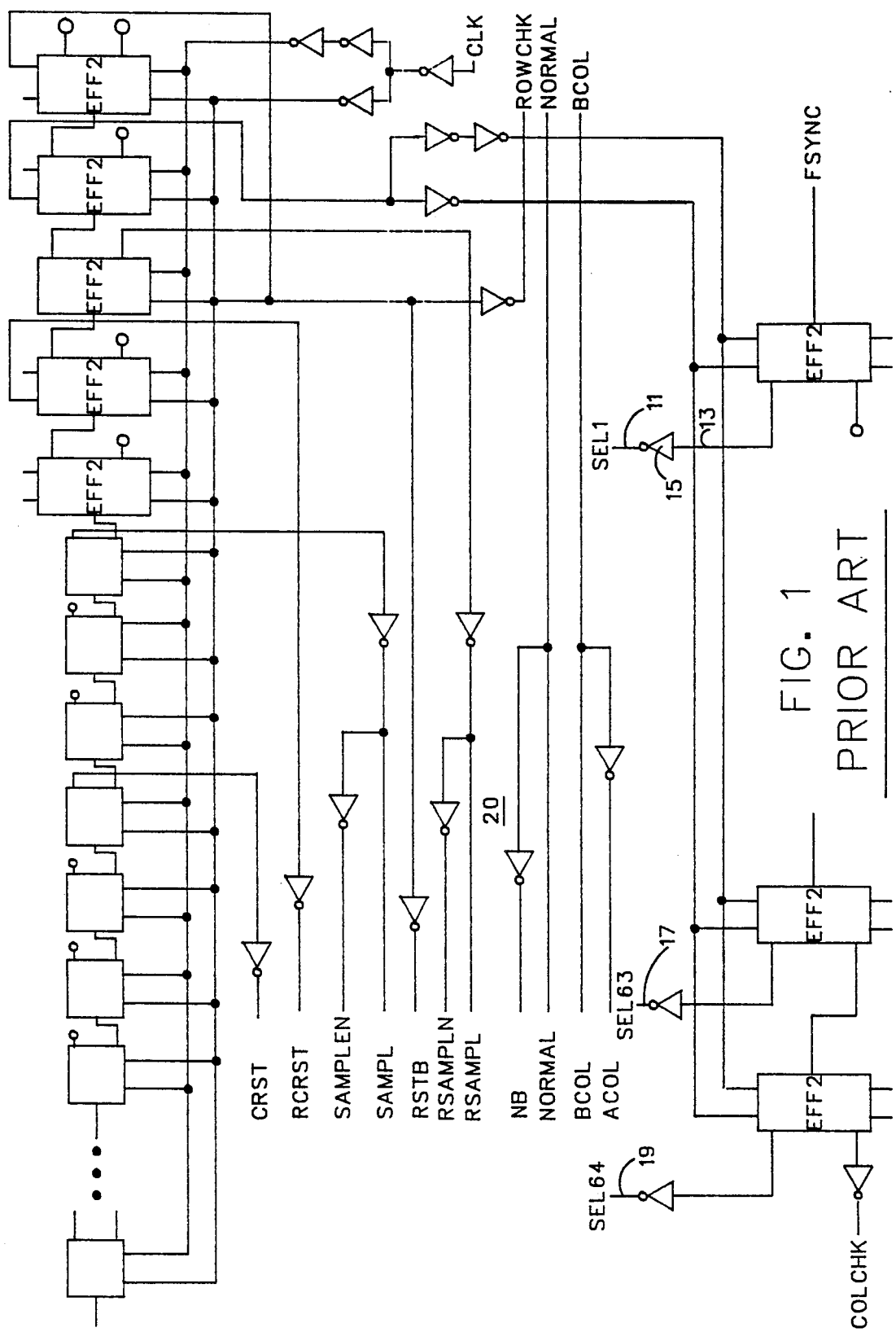
FIG. 1 depicts PRIOR ART logic for a fixed integration period scanning array.

In FIG. 1, a PRIOR ART system of multiplexed row/column integration scanning for a staring array is depicted. Select 1 terminal 11 receives a select signal on lead 13 via an inverter 15. The same circuitry obtains for SEL 1 through SEL 63 at 17 and SEL 64 at 19. Therefore, the prior art is not equipped to select portions of each scan to cope with system optics resulting in a variable gain signal across the array. The control electronics 20 is conventional.

Figure 1A:
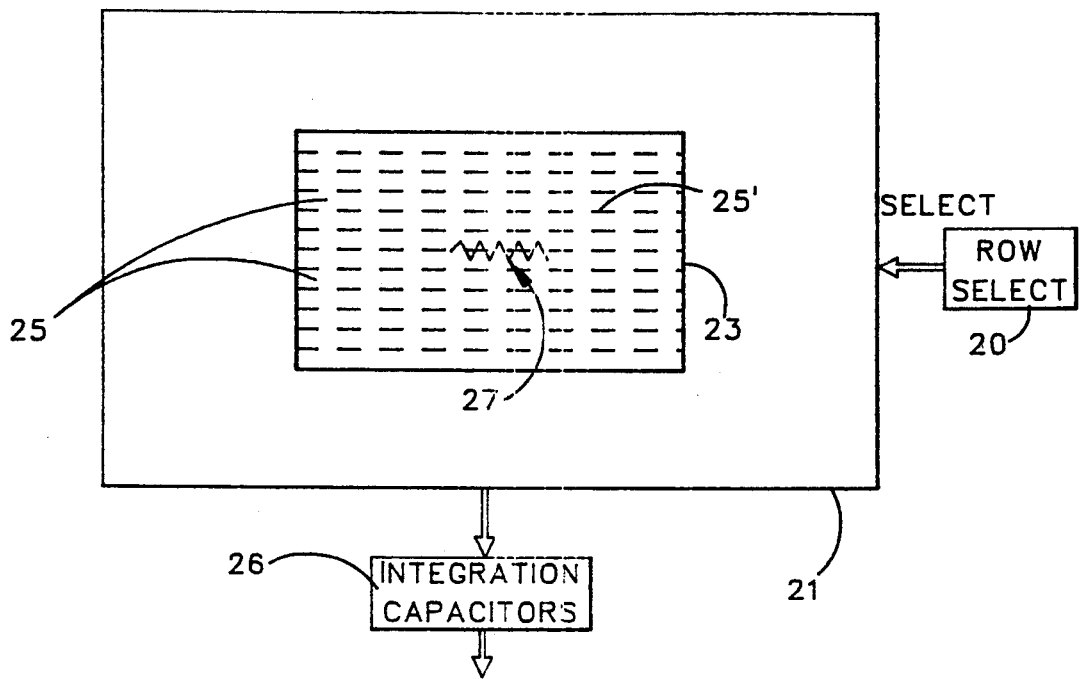
FIG. 1A shows a typical scan raster on a multiplexing chip with ROW select signal and Integration Capacitors.

Also, FIG. 1A shows a multiplexing chip with a scanned array or raster 23 having scan traces 25 thereacross. If it is desired to integrate differently the region 27 of line 25' (e.g.) to increase the intensity of a dull spot, or vice versa, decrease the intensity of a bright spot, the prior art is incapable of varying the integration only of the region 27, but must scan each line 25 at a constant integration.

Figure 2:
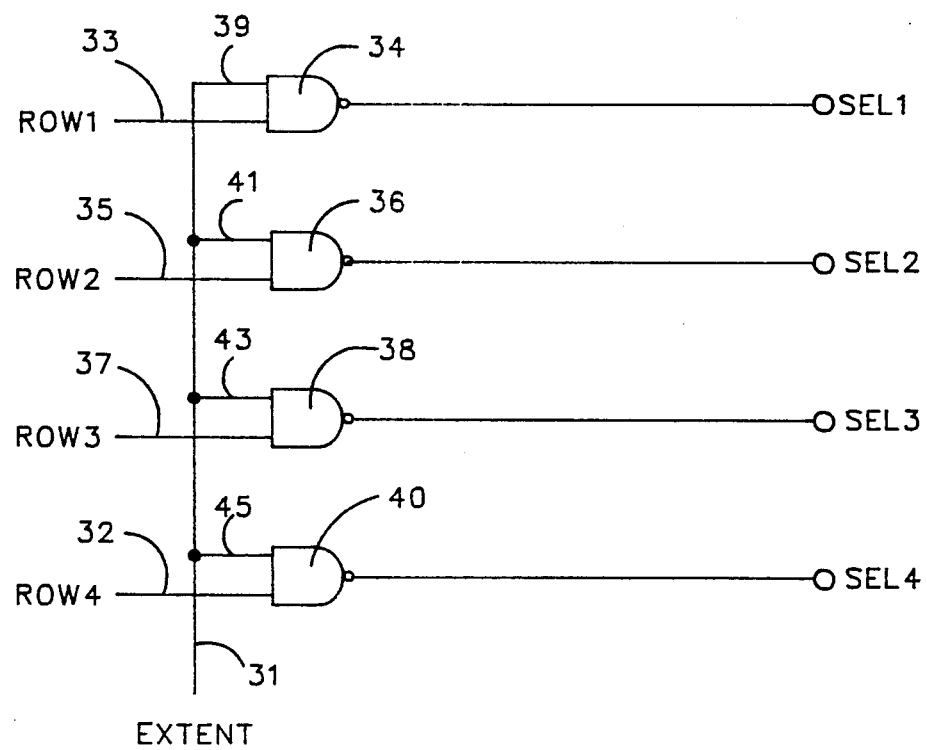
FIG. 2 shows the logic for the invention.

FIG. 2 shows the change in logic and the addition of an external signal line 31 for enabling flexible integration scanning.

The prior art signal for selecting ROW 1, 2, 3 and 4 remain the same and is delivered over leads 33, 35, 37 and 32. This signal is generated by a signal generator which is in reality the computer.

Each of leads 33, 35, 37 and 32, extends to a separate NAND gate 34, 36, 38 and 40 respectively, as one input thereto. The other input is derived from external lead 31 over leads 39, 41, 43 and 45.

Thus, when SEL 1 (11') is to be selected, both signals must be present on the leads 33 and 39. If the entire line scan for SEL 1 is to be fed into the integration capacitors, the row ON signal would be present and the external signal ON for the entire time allotted for scanning this line. In other words, the NAND gate produces a "0" for Selection. It becomes obvious then that the signals must be synchronized, which is accomplished in the computer which also acts as the signal generator for the external signal. However, if, for example, it is desired to vary integrating time only over the data line 25' (FIG. 1A), the row ON signal would remain ON across the line and the external signal would be ON only for that portion of the row time equal to the new integration time, indicated at 27. Of course, data line 25' could be located anywhere on the scan and could last even as long as the time for scanning the entire line or any fraction thereof.

It will be appreciated then, that the external signal really changes the gain of the detector output being fed to the integration capacitors.

Figure 3:
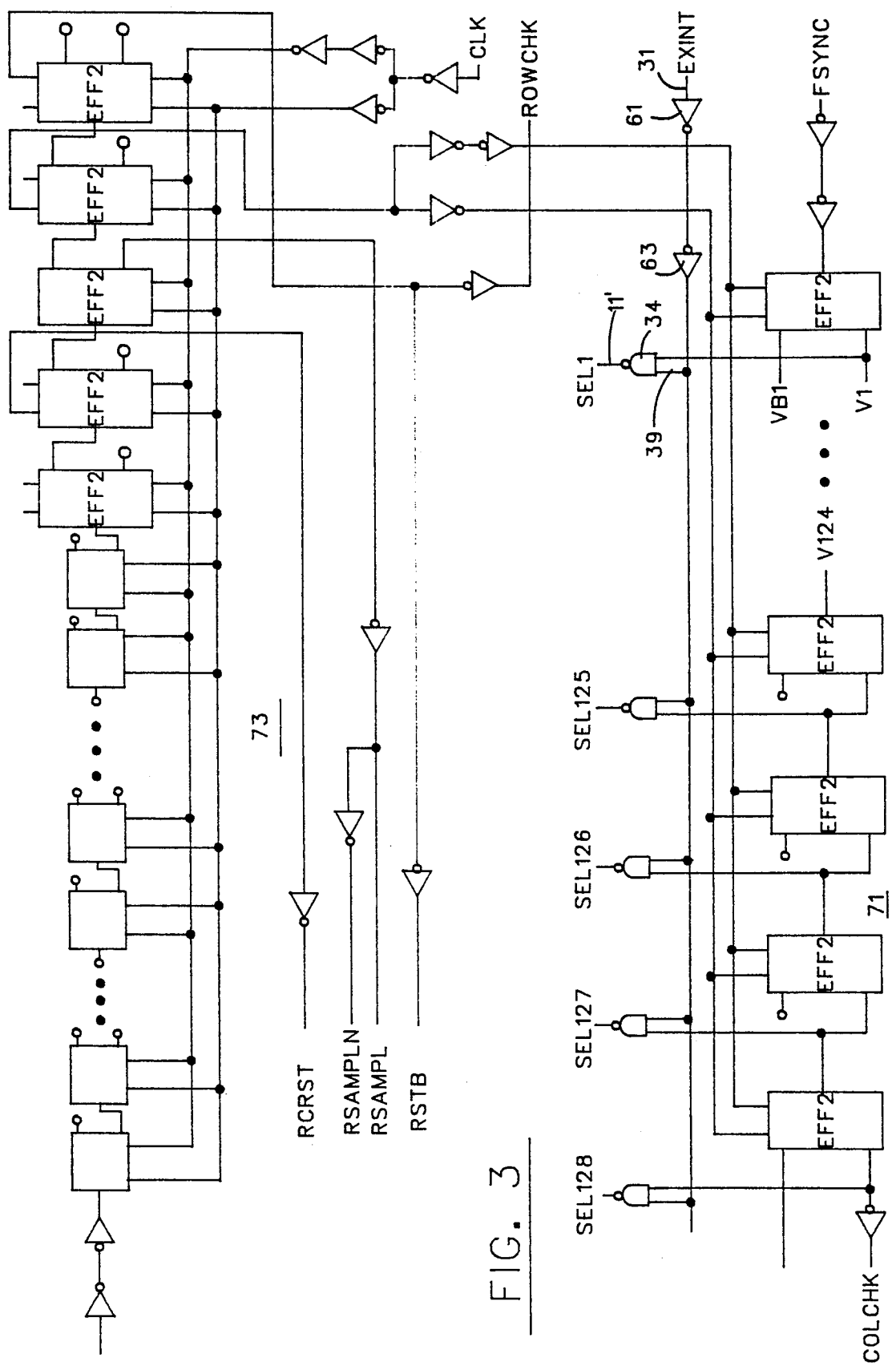
FIG. 3 is logic modified to allow for variable adjustment of integration time for each row using external control.

FIG. 3 shows the logic circuitry of the present invention connected in a 128×128 digital logic circuit for scanning staring arrays. The output select signal at SEL 1 (11') depends on the length of the external pulse from line 31 via isolation inverters 61, 63 applied over lead 39 to NAND gate 34. The same is true for SEL 125-128 where, for example, external line 31 applies the external signal over lead 65 to NAND gate 67 for nanding with select (SEL 125) signal on lead 69. The control electronics for selection shown at 71 and 73 is conventional.

What is claimed is:

1. A staring sensor array for detecting an object, comprising:

a staring detector array having a plurality of rows of detecting elements for generating signals corresponding to said object detected;

a plurality of integrating capacitors coupled to said detector array for integrating said signals to generate charge-carrier patterns;

row select means, for selectively causing rows of said detector array to be connected to said integrating capacitors by generating a row ON selection signal;

control logic means coupled to said row select means for controlling the time all or any of a portion of each row from said detector array is connected to said integrating capacitors, said control logic means:

receiving said row ON selection signal from said row select means;

generating a clocking signal having controllable on and off states corresponding to a portion of the time each row of said detector array is to be connected to said integrating capacitors; and nanding said row ON selection signal and its corresponding clocking signal to controllably connect said row to said integrating capacitors.

2. In a staring array system having a staring detector array having a plurality of rows of detecting elements for generating signals corresponding to an object detected, integrating capacitors coupled to said detector array for receiving said signals to generate charge-carrier patterns, and row selection circuit for selectively causing rows of said detector array to be connected to said integrating capacitors, a method for controlling the time all or any of portion of each row is connected to said integrating capacitors, said method comprising the steps of:

providing a row ON selection signal;

providing a clocking signal having controllable on and off states corresponding to a portion of the time each row is to be connected to said integrating capacitors; and nanding said row ON selection signal and its corresponding clocking signal to controllably connect said row to said integrating capacitors.

3. The method of claim 2, wherein:

the selection signal and its corresponding clocking signal are synchronized.

4. In a multiplexing staring array system having a staring detector array, integrating capacitors coupled to said detector array for generating charge-carrier patterns responsive to an object detected by said detector array, and row selection circuit for selectively causing rows of said detector array to be connected to said integrating capacitors, an improved method for permitting controllable connection time between each row and said integrating capacitors, comprising the steps of:

establishing a first signal generator for selecting the respective rows of said detector array to be connected to said integrating capacitors for a predetermined period of time;

establishing a second signal generator, synchronized to sai first signal generator, for determining the portion of said predetermined period of time that the selected row is actually connected to said integrating capacitors; and nanding the outputs of said first and second signal generators to modify the period of time of row connection.

5. A staring sensor array for detecting an object, comprising:

a staring detector array having a plurality of rows of detecting elements, for generating signals corresponding to said object detected;

a plurality of integrating capacitors coupled to said detector array for integrating said signals to generate charge-carrier patterns;

row select means, for selectively causing rows of said detector array to be connected to said integrating capacitors by generating a row ON selection signal;

control logic means coupled to said row select means for controlling the period of time all or any of a portion of each row from said detector array is connected to said integrating capacitors, said control means comprising:

means for receiving said row ON selection signal from said row select means;

means generating an external signal having controllable on and off states to correspond to all or a portion of the time each row is to be connected to said integrating capacitors;

means for nanding the row ON signal and the corresponding external signal to control the time each row is connected to said integrating capacitors.

6. The apparatus of claim 5, further comprising:

means for synchronizing the selection signal and the external corresponding signal.

7. In a multiplexing staring array system having a staring detector array for generating signals corresponding to said object detected, integrating capacitors coupled to said array for integrating said signals to generate charge-carrier patterns, and row select circuit for selectively causing rows of said detector array to be connected to said integrating capacitors, an improvement for controlling the time all or any portion of each row is connected to said integrating capacitors, comprising:

first signal generator means for selecting the respective rows of the array to be connected to said integrating capacitors;

second signal generator means, synchronized to said first signal generator means, for providing controllable ON and OFF states corresponding to when the selected row is to be connected to said integrating capacitors; and means for nanding the outputs of the first and second signal generator means to control the time the selected row is connected to said integrating capacitors.

* * * * *